No. 658,493. Patented Sept. 25, 1900.
J. R. TRIGWELL.
JOINT FOR CYCLE FRAMES.
(Application filed Dec. 28, 1897.)
(No Model.)
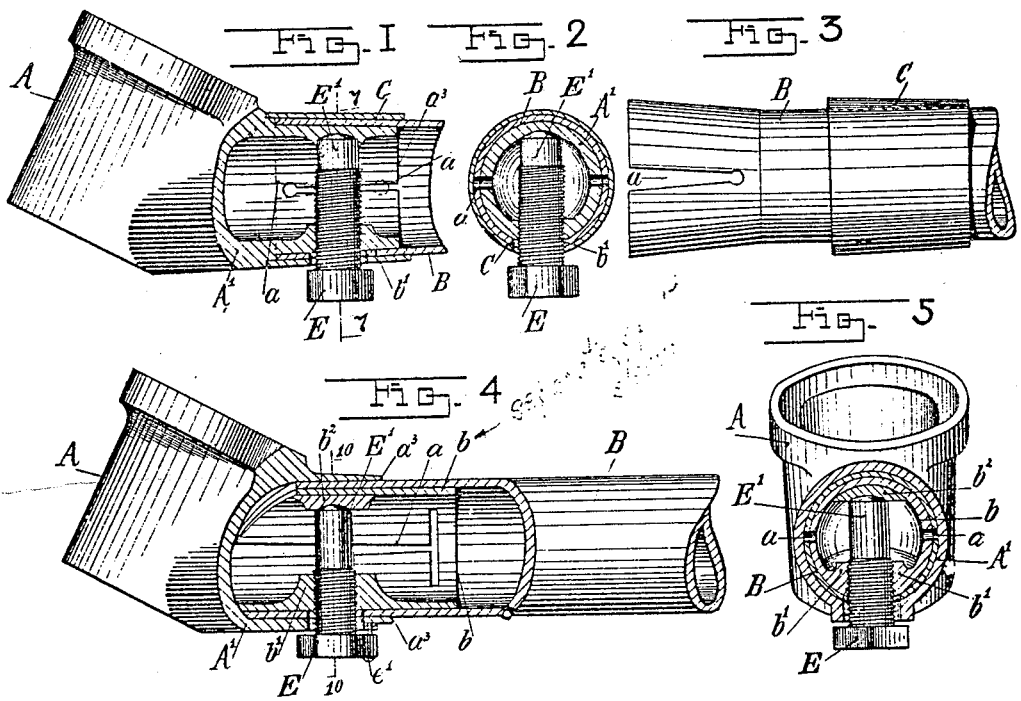

UNITED STATES PATENT OFFICE.

JAMES RICHARD TRIGWELL, OF LONDON, ENGLAND.

JOINT FOR CYCLE-FRAMES.

SPECIFICATION forming part of Letters Patent No. 658,493, dated September 25, 1900.

Application filed December 28, 1897. Serial No. 663,896. (No model.)

*To all whom it may concern:*

Be it known that I, JAMES RICHARD TRIGWELL, cycle manufacturer, a subject of the Queen of England, and a resident of 146 Brixton Hill, London, in the county of Surrey, England, have invented new and useful Improvements in Joints for Cycle-Frames and the Like, (for which I have obtained a patent in England, No. 20,146, dated September 11, 1896,) of which the following is a specification.

This invention relates to the joints of the frames, forks, &c., of cycle-frames and other like tubular articles of the kind known in the trade as "brazeless joints"—that is to say, joints which can be easily completed without requiring to be brazed, which latter operation, besides frequently burning or spoiling the metal owing to the relatively-high temperature necessary to melt the brazing metal, requires careful trimming or filing to make the joint presentable, and this often results in the exceedingly thin tubes such as are used for cycles being filed through in places.

Joints of the kind hereinbefore referred to as hitherto employed have principally been made as permanent joints, and when made of a detachable character have generally been found to work loose with the constant vibration of the machine, or else have been so made as to materially increase the weight of the machine or to strain the tubes to such an extent as to cause the rupture thereof after the machine has been running for a comparatively short time.

The object of my invention is to join together the parts of frames, forks, &c., of cycle-frames and the like tubular articles in such a manner as to provide a joint which is at once light, rigid, and strong without exercising undue strain on the tubes or other parts and whereby also the parts can be readily detached when so desired.

In the accompanying drawings, Figure 1 is a partly-sectional side elevation of my invention. Fig. 2 is a cross-section of the same on line 7 7 of Fig. 1. Fig. 3 is a detached side elevation of the tube and coned cap shown in Fig. 1. Fig. 4 is a partly sectional side elevation of a modification of my invention. Fig. 5 is a cross-section of the same on line 10 10 of Fig. 4.

The same letters of reference where they occur are used to denote the same or corresponding parts in all the figures.

In the form shown in Figs. 1, 2, and 3 the lug branch A' of the lug A is divided or split longitudinally and at diametrically-opposite parts, and it is preferable also to split the tube B, as shown at $a$, and the lug branch A' is tapered, being smaller outside at $a^3$, and the tube B is slipped thereover and a conical sleeve C fitted on outside the tube. The joint is made by means of a screw-stud E, which passes through corresponding holes formed in the sleeve C, the tube B, and the lug branch A' in such a position that the stud E passes at right angles to the splits $a$ in the lug branch and tube, as shown in Figs. 1 and 2. The hole $b'$ in the lug branch is internally threaded, so as to form a nut for the screw-stud E. The said screw-stud is sufficiently long to reach to the opposite interior wall of the lug branch, and when screwed up in the threaded hole $b'$ the front end E' of the stud E bears against the opposite wall of the split branch A' of the lug, expanding the parts thereof and forcing them against the split tube B, which latter is thereby expanded and pressed tightly against the immovable conical sleeve C, thus effecting a firm and rigid joint.

In the form shown in Figs. 4 and 5 the tube B and the cylindrical internal ferrule or liner $b$, which tightly fits the interior of the same, acting as a brace or reinforcement, are both divided or split longitudinally and at diametrically-opposite parts, as shown at $a$, and the lug branch A' is tapered, being smaller outside at $a^3$, as in the form shown in Figs. 1 to 3; but in this case the tube, with the ferrule or liner $b$ therein, is slipped inside the lug branch. The joint is made by means of a screw-stud E, which acts in the same manner as the similar part described with reference to Figs. 1 to 3, the screw-stud engaging in a female screw threaded in the liner-wall or in a block $b'$, forming part of or secured to the inner wall of the liner $b$, as shown. The farther end E' of the stud E bears on a block on or secured to the opposite wall of the ferrule or liner, or the block $b^2$ may be dispensed with and the end E' may bear direct on the opposite inner wall of the ferrule or liner. It will be understood that the lug branch A' and the tube B are provided with corresponding apertures to admit the stud E and that a tight joint between the parts is effected by screwing up the stud E until the parts of the split ferrule or liner b are expanded sufficiently to cause the split parts of the tube to form a tight joint with the interior walls of the lug. To prevent the stud E from accidentally slacking back from vibration or jolting, a small set-screw e' is passed through the head thereof to bear on the lug, or equivalent means may be adopted.

In all the figures of the drawings the socket, tube, and ferrule are shown as three concentric parts fitting together, all except the outermost of the said parts being longitudinally slotted to allow expansion and a screw being passed transversely into them, engaging the innermost of the said parts and acting on its inner face to cause such expansion and tighten the joints.

What I claim as my invention, and desire to secure by Letters Patent, is—

1. In joints for cycle or other frames, the combination of a member having a lateral socket with a tube fitting the latter, a ferrule fitting the said tube and a transverse screw extending inward through openings in the said ferrule, tube and socket, engaging threads in the innermost of the said three concentric parts and acting expansively against its inner face, the two inner parts being longitudinally slotted, substantially as set forth.

2. In joints for cycle or other frames, the combination of a member having an outwardly-tapering lateral socket which is screw-tapped and split longitudinally, with a tube fitting outside said socket, a ferrule fitting on the said tube, and a transverse screw extending inward through openings in the said ferrule and tube engaging the screw-threads of the said socket and operating against the inner face of the latter to expand the said socket and bind the said parts of the joint together, substantially as set forth.

JAMES RICHARD TRIGWELL.

Witnesses:
W. S. ABRAHAM,
FRED C. HARRIS.